United States Patent [19]

Shimoni

[11] Patent Number: 4,654,795
[45] Date of Patent: Mar. 31, 1987

[54] IMAGE PROCESSING SYSTEMS AND METHODS

[75] Inventor: Yair Shimoni, Jerusalem, Israel

[73] Assignee: Elscint Ltd., Haifa, Israel

[21] Appl. No.: 591,414

[22] Filed: Mar. 20, 1984

[51] Int. Cl.$^4$ .................... G06F 15/42; G01T 1/20
[52] U.S. Cl. .................... 364/414; 364/571; 250/363 S; 378/901
[58] Field of Search .................... 364/413–415, 364/417, 571, 574; 250/363 R, 363 S, 369; 378/4–5, 10, 21–23, 28, 901; 358/111, 903; 382/6, 50–52

[56] References Cited

U.S. PATENT DOCUMENTS

| | | | |
|---|---|---|---|
| 3,011,057 | 11/1961 | Anger | 250/71.5 |
| 3,778,614 | 12/1973 | Hounsfield | 250/362 |
| 4,197,583 | 4/1980 | Westell et al. | 364/414 X |
| 4,200,793 | 4/1980 | Nagasawa et al. | 250/363 S |
| 4,203,035 | 5/1980 | Grenier | 250/363 S |
| 4,228,515 | 10/1980 | Genna et al. | 364/571 |
| 4,274,001 | 6/1981 | Nagasawa | 250/363 S |
| 4,432,059 | 2/1984 | Inbar et al. | 364/414 |
| 4,468,744 | 8/1984 | Kakegawa et al. | 364/414 X |
| 4,497,024 | 1/1985 | Roth | 364/414 |
| 4,563,583 | 1/1986 | Hattori | 250/363 S |
| 4,566,074 | 1/1986 | Nishikawa | 364/571 |

OTHER PUBLICATIONS

B. Efron et al., "Stein's Paradox in Statistics", *Scientific American*, May 1977, pp. 119-127.

*Primary Examiner*—Gary V. Harkcom
*Attorney, Agent, or Firm*—Sandler & Greenblum

[57] ABSTRACT

An image optimizing method for reducing statistical noise in medical diagnostic images constructed from data obtained by the interaction of radiation and detectors. The radiation occurs in a random manner such that the data obtained at specific locations on the detectors are only estimates of "true" values of the data at the locations. The method includes the steps of fitting a surface to each of the locations; the surface is defined by the measured values of the location and neighboring locations. The fitted surface is used to determine new values for each of the locations. It has been found that the new values are closer to the "true" values of the data at the locations than were the measured values.

15 Claims, 5 Drawing Figures

IMAGE PROCESSING SYSTEMS AND METHODS

FIELD OF THE INVENTION

The present invention relates generally to image processing systems and methods for producing and modifying images used for example in clinical studies of the heart, brain, lungs, kidneys and other organs, and more particularly to systems and methods for optimally enhancing said images.

In particular, the inventive system improves the signal-to-noise ratio in images which are statistically limited, and results in images comparable to those acquired by prior art methods using substantially longer time periods or substantially more radiation.

BACKGROUND OF THE INVENTION

A number of medical diagnostic imaging systems known in the art are examples of systems which would be improved by implementing the basic concept of the present invention.

In general, the prior art systems utilize detectors to sense radiation such as X or $\gamma$ flux interacting with the detectors and to convert each quantum of X- or $\gamma$-rays to individual electrical output pulses or to convert integrated inputs to proportional electrical outputs. Location-computing circuitry calculates the X and Y coordinates of each interaction and thus identifies the elemental area of the detector or array of detectors within which an interaction (event) occurs to a given accuracy. The systems further process and display images produced from the detected data. For example, the present invention may be implemented as a data processing means for a Gamma Camera (Scintillation Camera) of the Anger type. Such cameras are widely used in Nuclear Medicine as radiation detectors for determining the distribution of a radioactive substance in a body. The camera converts images formed by gamma radiation into a related visible image. See, for example, U.S. Pat. No. 3,011,057 in which typical Gamma Camera apparatus is disclosed for collecting information from patients after the administration of radio-nuclides through inhalation, ingestion or injection.

The present invention can also be used in Computerized Axial Tomography (CAT) and ultrasound imaging, as well as in non-diagnostic systems such as starlight intensifiers, radar systems and so on. Apparatus for performing Computerized Axial Tomography, for example, produces a representation of the absorption coefficients of penetrating radiation from a source of X-rays at a plurality of elemental locations distributed over a cross-sectional slice of a body under investigation. Such apparatus well-known to the persons skilled in the art is disclosed, for instance, in the U.S. Pat. No. 3,778,614.

Regardless of the nature of the body being examined, and the type of radiation, only those beams incident on a radiation detector in accordance with the present invention contribute to the outputs of the detector.

As used herein the "actual physical data" that is being measured, processed and used, means either a distribution (spatial or projected) of absorption density, such as tissue density in the case of X-rays, a distribution of radioisotope concentration in the case of $\gamma$-rays, a distribution of tissue interfaces in the case of ultrasound detection, or a distribution of radar reflectors, optical sources or reflectors and so on, depending on the case.

The actual physical data obtained from Gamma Camera or CAT systems includes significant amounts of "statistical noise".

The "statistical noise" is the random variation between the "true" value, which would have been achieved by imaging the object with infinite radiation and the actual measured values which also depend on the statistical variability of finite radioactive or absorption events. Conventional data processing techniques, for example those producing and displaying images obtained from Gamma Camera or CAT systems, include arrangements for reducing the statistical noise. More particularly, smoothing of different types, filters of different types and correctors of different types are provided, all of which are based on some "global" assumption such as the known aperture of the system or the known resolution limit below which everything is considered as "statistical noise". These "global" assumptions, as used in the prior art, have often tended to degrade the images by either actually increasing the noise or reducing the resolution, because of variations between the local case and the global assumptions. Thus, there is a long felt need for means other than prior art arrangements for reducing the statistical noise.

BRIEF DESCRIPTION OF THE INVENTION

It is an object of the present invention to provide image-optimizing techniques generally and particularly for use with medical diagnostic imaging radiation detectors. The image-optimizing techniques, in accordance with one aspect of the present invention, are incorporated in digital image-processing systems used with medical radiation apparatus. They are used to calculate estimators of the actual physical data being measured in a way that maximizes the likelihood that the estimators are correct.

In this way the image optimizing techniques help to reduce the amount of statistical "noise" in the image.

The present technique, although incorporating whatever knowledge we have of the aperture or resolution, does not treat these known factors as global constants; instead, the corrections to the actual physical data are performed during the suggested optimizing process, using regional and semilocal data.

The method used to reduce the amount of statistical "noise" in the image by the present invention is based in part on an "estimation" technique developed by Stein and others for sampling and polling. (See "Stein's Paradox in Statistics" by Bradley Efron and Carl Morris, Scientific American, May 1977, pp 119-127.) Stein's theory, as incorporated into applied statistics, concerns the use of the averages of observed quantities to estimate unobservable quantities. In accordance with James and Stein an estimator for unobservable quantities may be determined by the relation $Z = \overline{Y} + C(Y - \overline{Y})$, where Y is the average of a single set of data, $\overline{Y}$ is the grand average of averages and C is a constant defined as a "shrinking factor".

Essential differences between the Stein-James estimator and the image optimizing method and system used in accordance with the present invention as well as other features and advantages of the invention will become more apparent as the invention becomes better understood from the following detailed description made in conjunction with the accompanying drawings, wherein:

GENERAL DESCRIPTION

Figure 1:
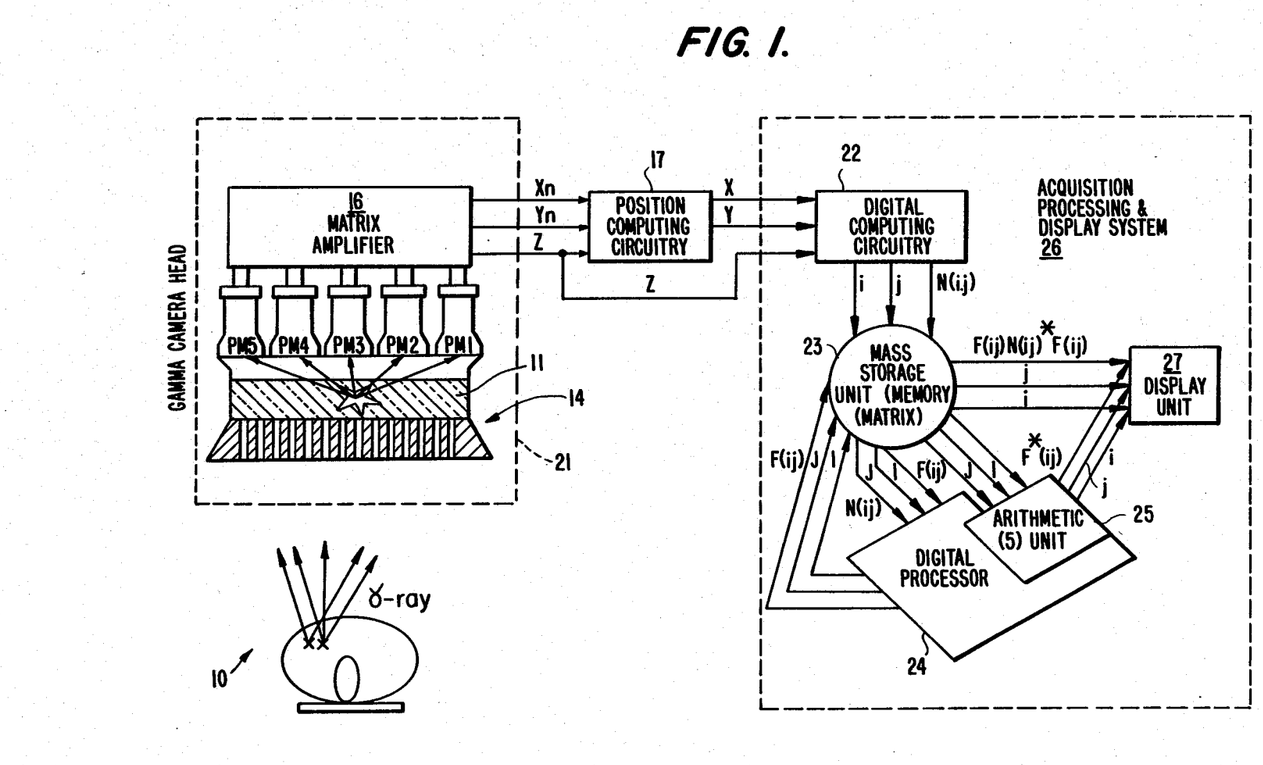
FIG. 1 is a block diagram representation of a medical radiation detector system in accordance with the present invention.
Figure 2:
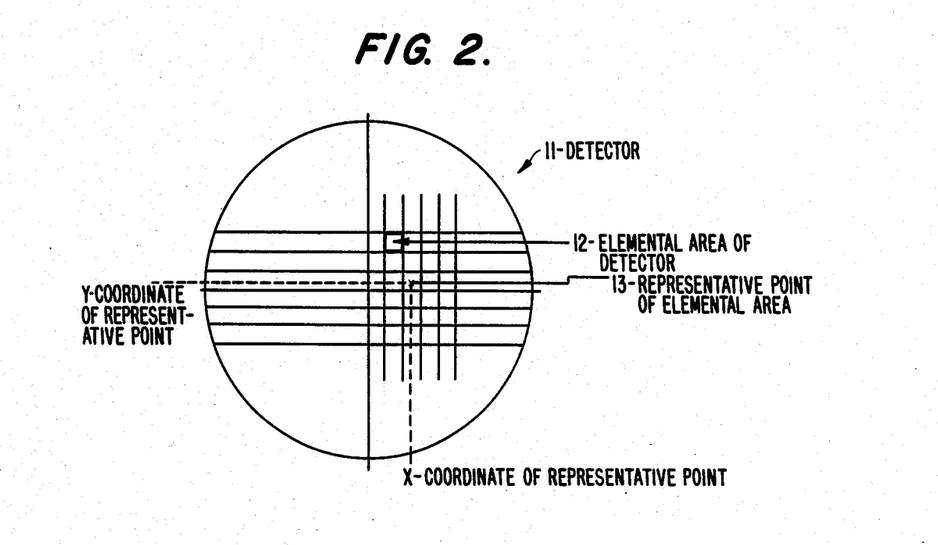
FIG. 2 is a plan schematic view of a detector of the system of FIG. 1 in accordance with the present invention.
Figure 3:
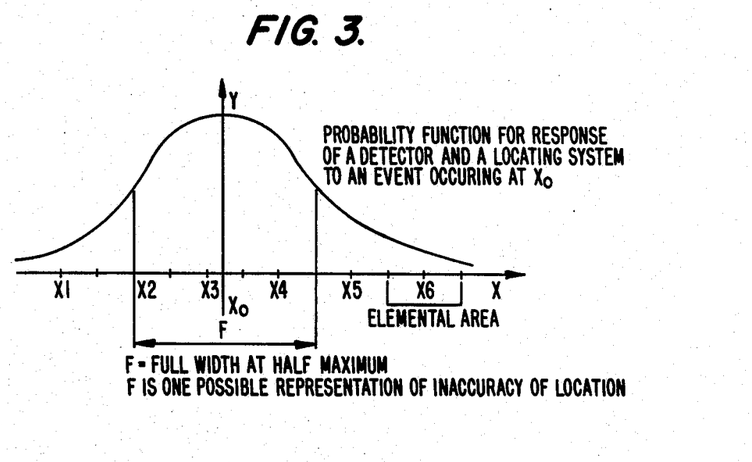
FIG. 3 is a graphical representation of the accuracy of locating an event.

FIG. 1 at 10 shows a medical diagnostic imaging system for carrying out the image optimizing method in accordance with the present invention. The head or front end is designated by numeral 21. It generally comprises a source of X-ray or γ-flux, and detector means 11 such as at least one scintillation crystal. Transducer means such as an array of photomultipliers 14 is shown mounted proximate to the scintillator. The photomultipliers convert the light output of the scintillators to electrical signals. The electrical signal outputs of the photomultipliers are amplified in matrix amplifiers 16.

Position computing circuitry 17, for computing x and y coordinates of an event and thus identifying the elemental area within which an event occurs, are provided. The circuitry 17 receives location information and the energy signals for the particular locations from the matrix amplifier 16. The computed, x,y location of each event is at the output of circuitry 17.

Means are provided for processing the signals received from circuitry 17. More particularly processing and display equipment 26 is provided. The equipment includes digital computing circuitry 22 for counting the electrical pulses connected with the arrival of X-ray or -photons at the said detector means and for storing the original event counts (N) in a two-dimensional matrix memory 23. A digital processor 24 transforms the number (N) of events at given x and y locations to processed data (F); for example, by multiplying the said number (N) by a given arbitrary normalization factor G. The obtained processed data (F) is then stored in the matrix at the location corresponding to the x,y location of the event.

The matrix memory 23 in the present invention may reside either in the internal memory of the processor or on some external memory like a magnetic tape, a disk or a floppy disk.

Although the description is drawn to an embodiment in which the matrix (23) has two dimensions, i and j, representing the x and y coordinates, it is evident to those skilled in the art that the same methods and techniques are also valid for matrices having one dimension i or three dimensions (i,j,k) where the third dimension represents such characteristic as either the third space dimension or the time dimension. Also, although the description is drawn to x- or γ-ray detection, the methods may also apply to other energy means used for producing images such as (but not limited to) phonons, infrared radiation, radio wave radiation and microwave radiation.

An arithmetic unit 25 shown in FIG. 1 may be incorporated in the present invention into the digital processor 24, used for modifying the stored data (F) and replacing the stored data by the modified data, providing a less noisy image on display unit 27. The less noisy image is provided in the present invention by following the image-optimizing techniques fully illustrated in FIG. 4.

Figure 4:
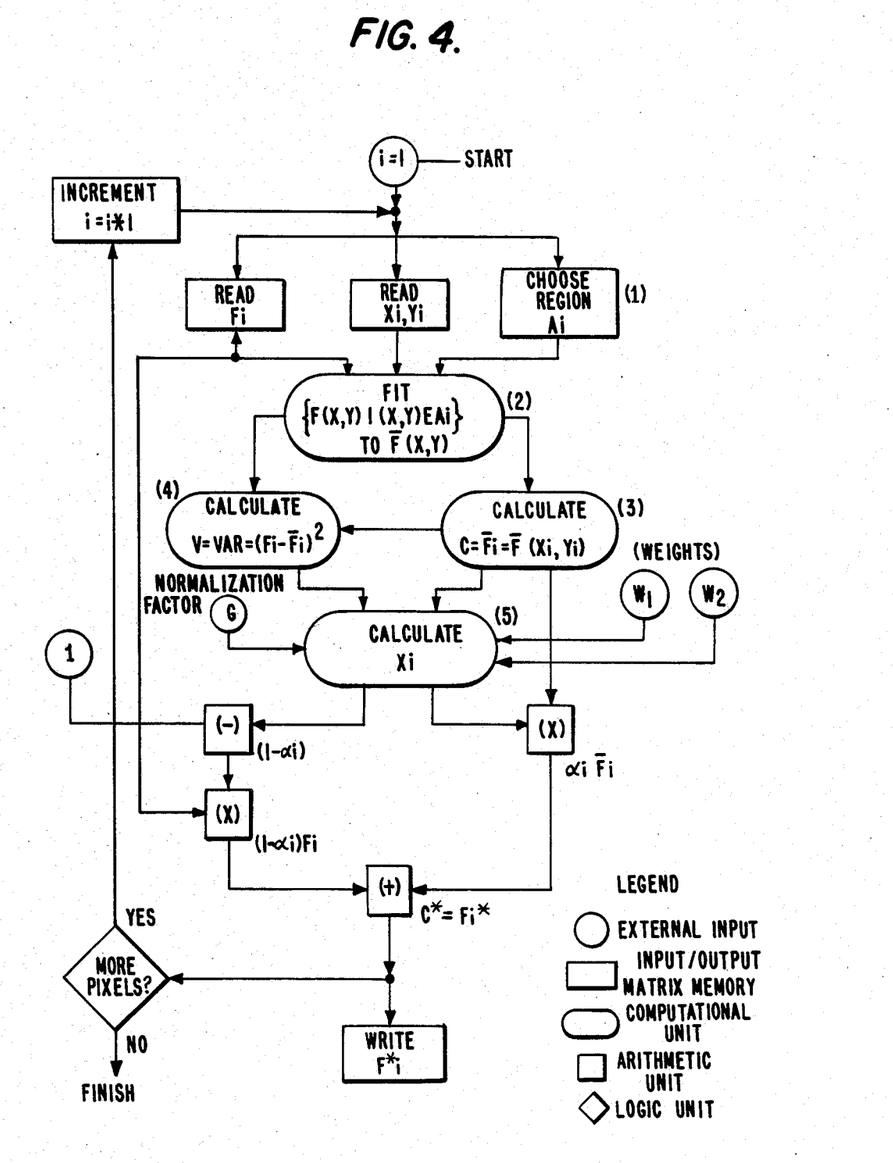
FIG. 4 is a flow diagram of the present invention.

This image-optimizing phase accepts as inputs a normalization factor (G), two weights W1 and W2 associated with the stored data (F), and the matrix of the stored data (Fi) corresponding to element i defined by position coordinates xi and yi.

The normalization factor (G) can be either the known normalization factor or an arbitrary constant or a factor calculated from the stored data (F). The stored data (F) in the conventional radiation-measuring process is generally retained in a matrix of columns and rows. The matrix locations are specifically related to elemental areas at corresponding locations on the detector. The data stored in the matrix is generally accepted as being an estimator of some property of the organ or tissue being examined. For example, in a Gamma Camera the stored number of counts is taken to represent the number of radioisotope emissions striking the detector along the line of sight. However, the generally accepted procedure for working with known Gamma Cameras and X-ray tomographs produces images whose quality is limited by the total event counts (statistics limited). Due to the randomly irregular nature of radioactive emission and radiation absorption the same amount of radioisotope emission or radiated organ absorption observed for the same length of time will result in different event counts each time. It is usually accepted that the average number from many such observations is the "true" estimator, and the differences between different measurements and this value are considered statistical noise.

Therefore a present need exists for reducing such noise by using radiation-measuring equipment offering techniques which provide a new estimator value closer to the "true" estimator.

The reduction of such noise is presently best achieved by using more photons; such as by either increasing the radiation dose or the examination duration. Both of these prior art solutions have severe drawbacks. Other methods provide a new estimator obtained from the acquired data without increasing the radiation dose or the examination time. The new estimator value is obtained by an examination of the data in neighbouring line-of-sight locations and reduces the number of photons required per line-of-sight. The data in the neighbouring line-of-sight locations or an estimator based on such data can be used in place of measured values, if the temporal "noise" is approximately equal in magnitude to the spatial "noise". This assumption is justified if due notice is taken of the true morphological variation in the amount of radiosotope emission from point to point.

An essential part of the invention is the fitting of a two-dimensional surface representative of this variation in the measured quantity of events from point to point to the stored measured data (F) around the point of interest. The residual variation is representative of the statistical noise (both temporal and spatial) and can be used as a measure of the success of the fit. For regions that are small enough, two dimensional 2nd order surfaces usually provide a close fit of the morphology. For larger regions, higher order functions are necessary. The fitted surfaces are relatively insensitive to the local "noise" and become less sensitive with larger regions. By using optimizing techniques for bivariate probabilities, it can be concluded that the best estimator that can be derived from the data (F) stored in the matrix and the fitted surface is: $C^* = \alpha \bar{C} + (1-\alpha)C$; where:

$C^*$—is the new calculated estimator;
$\bar{C}$—is a regional estimator as derived from the fit of the two-dimensional surface to the measured data;
$C$—is a local estimator from the stored data, usually taken as the stored data itself at the point of interest; $C = F(X, Y) = Fi$;
$\alpha$—a localized weight function depending on $C$, $\bar{C}$ and $V$—the regional variability of the processed data (F) around the said two-dimensional surface.

The arithmetic unit 5 accomplishes the optimizing process, accepting the input mentioned above. From this input the arithmetic unit 5 proceeds by using the processed data (F) stored in a given matrix element, together with the processed data (F) stored in neighbouring matrix elements, for instance, in accordance with the following steps:

1. Choosing a region around each point corresponding to a matrix element, the region size being determined by the assumed accuracy of the identification of the X and Y coordinates, said point serves as a center point for the region;
2. Fitting a two-dimensional surface to the processed data (F) of all the points (i.e. matrix elements) inside said region;
3. Calculating the regional estimator C at the said point, for example by taking C to be the value of the said surface at the center point of the region;
4. Obtaining the regional spread V, for example, by taking the variability of the processed data around the said surface in the said region;
5. Computing the regional weight $\alpha$ and the local weight $(1-\alpha)$, wherein $\alpha = (W_2 C)/(W_1 V + W_2 C)$; where W1 and W2 depend on assumptions made on the nature of the processed data (F), and for the case of event counting are calculated by the formulae:

$$W_1 = (2C/G)/(C/G + \bar{C})$$

$$W_2 = 2\bar{C}/(C/G + \bar{C})$$

and G is the said normalization factor;
6. Obtaining the new estimator C* by multiplying the regional estimator (C) by the regional weight, the local estimator (C) of the given point, which can be Fi by the local weight $(1-\alpha)$, and summing the two products. The above weights are calculated to maximize the likelihood of the new estimator being correct: $C^* = \alpha \bar{C} + (1-\alpha)C$.

At the end, means are provided for displaying the improved image obtained by the above process and means are provided for replacing the stored data (F) by the improved results or for storing both. Thus, for obtaining this new "true" estimator, the data which was spread around each point was used to correct the value (data) which was measured at the point. The techniques and methods, in accordance with the present invention, optimize the probability of correctness and thus simulate the effects of obtaining a larger event count, which would necessitate using undesirable methods such as lengthening the acquisition time or enlarging the dose of the radio-active pharmaceutical or the X-ray flux.

In addition it should be noted that the image-optimizing techniques for obtaining the "true" estimator substantially differ from Stein's method and other methods derived from Stein's methods. These differences arise from the following factors: Stein's method and the methods following it were either one-dimensional or had no well-ordered two-dimensional arrangement, such as demographical data.

Figure 5:
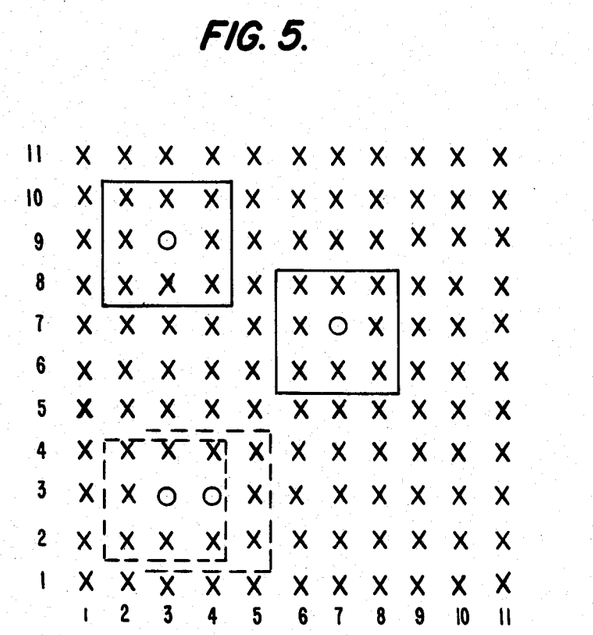
FIG. 5 is a schematic representation of the definition of regions around different points in the matrix.

Digital images, on the other hand, have a well-ordered two-dimensional arrangement and the correlation between close neighbours falls off with distance in a fairly location-independent way. This fact makes it possible to apply a region of constant shape and size around each point, within which we assume all points to be highly correlated with the center point (see FIG. 5).

The nature of the physical data is such that all values of the event-counts, processed data, fitted data, optimized data and so on, are non-negative over the whole image. This constraint causes the local weight $(1-\alpha)$ and the regional weight $(\alpha)$ to be in the region of between 0 and 1. Such constraints were not an inherent part of Stein's method.

The regional fit of the surface to the data utilizes only the data that could have come from the same aperture as the data at the point being processed. Demographical data have no such physical aperture, therefore a fit is usually done with a global variable or at least a regional variable of a region which is very large and having a shape which depends on the case. From this follows that whereas the arithmetic unit (5) performs a fit over a different, although similarly shaped region for each point being processed (see FIG. 5). Stein's method after defining the region uses the same regional estimator for all points within the region.

The same sort of consideration forced Stein and his followers to fit the data to a constant which is usually the regional average. The present invention, on the other hand, takes into account the morphology of the object under examination by fitting the data inside each region to a more general two-dimensional surface.

The nature of the physical data used in imaging is such that it is statistically limited. The physical data thus comes with a criterion for its reliability, namely, the mean relative error of the data at each point is equal to the inverse of the square root of the original number of counts on which this data is based. This fact is incorporated in the weights used in the arithmetic unit (25) resulting in regional and local weights much different from those used by Stein which have no such inherent reliability measure. The nature of the fit also indicates the use of the relative variability of the data around the fitted surface as the measure of reliability of the regional estimator. This is consistent with the reliability measure used for the local estimator and replaces the standard deviation used by Stein and his followers.

As a result of all the above points the regional weight $(\alpha)$ obtained herein is independent of the local estimator (C) and also of the local "noise" ($\sqrt{C}$), unlike other weighting methods where $\alpha$ depends on both local and regional estimators and on the reliability measures of both of them. For the case of event counts, the above regional weight $(\alpha)$ is given by:

$$\alpha = \bar{C}/(V/G + \bar{C})$$

The above methods of the image optimizer of the present invention elevate the performance of the medical diagnostic imaging systems.

While the invention has been particularly shown and described with reference to several embodiments from nuclear medicine, it will be evident to those skilled in the art that it can be implemented in industrial, military, astronomical, scientific, and other imaging systems including other medical imaging systems, without departing from the spirit and the scope of the invention. It being understood that all these uses are encompassed within the scope of the invention as determined by the accompanying claims.

What is claimed is:

1. An image processing system for enhancing images obtained from data detected on a statistical basis by processing the detected data to decrease the difference between the detected data and "true" data, said system comprising:

a radiation detector for detecting radiation;

locating means for locating with a given accuracy elemental areas of said radiation detector at which radiation is detected, the location of each of said elemental areas of said detector represented by a single point central to said elemental area, a matrix means having elements therein which correspond to said elemental areas;

data processor means which transform the totality of the detected radiation to processed data related to each of said elemental areas for storing in the corresponding elements of said matrix means, an arithmetic unit for modifying the stored processed data, said arithmetic unit including: means for choosing a plurality of regions of matrix elements, said regions of matrix elements each being centered about one of the matrix elements containing a point corresponding to a selected point on said detector, means for fitting a surface to said stored processed data at each of said points in said region of matrix elements, and said arithmetic unit including means for modifying the stored processed data to conform to said fitted surface at each of said points corresponding to said selected points, said modified data being closer to the "true" data than said stored processed data.

2. The image processing system of claim 1 wherein said matrix means is two dimensional with said elements each identified by its center point (i,j) where i,j are variables in a Cartesian coordinate system having orthagonal axes (I,J), said elemental areas each being identified by its center point (x,y) where x,y are variables in a Cartesian coordinate system having orthogonal axes (X,Y), and each of said i,j points having a corresponding x,y point.

3. The image processing system of claim 2, wherein said detector means includes means for detecting $\gamma$-ray flux, and for converting each quantum of $\gamma$-rays to an individual electrical output pulse, and wherein said locating means comprises location computing circuitry for calculating the x, y coordinate of each event.

4. The image processing system according to claim 3, wherein:

said means for choosing a plurality of regions around each point corresponding to a matrix element including means for determining the region sizes by the inaccuracy of the identification of the x and y coordinates of each point, each of said points serving as a center point for one of the regions;

means for fitting the stored processed data (F) of all the points inside said region to said surface, said surface being two dimensional; means for calculating a regional estimator $\overline{C}$ at the said point, by taking $\overline{C}$ to be the value of the said two-dimensional surface at the center point of the region;

means for obtaining the regional spread V by taking variability of the stored processed data around the said two-dimensional surface in the said region;

computing a regional weight $\alpha$ and a local weight $(1-\alpha)$ wherein:

$\alpha=(W_2C)/(W_1V+W_2C)$;

where $W_1$ and $W_2$ are calculated by the formulae $W_1=(2C/G)/(C/G+\overline{C})$;

$W_2=\overline{2C}/(C/G+\overline{C})$;

G being the said normalization factor, calculated from the detected radiation; means for obtaining a new estimator C* by multiplying the regional estimator $\overline{C}$ by the regional weight $\alpha$, the stored processed data (F) of the given point by the local weight $(1-\alpha)$ and summing the two products.

5. The image enhancing system of claim 1, wherein: said radiation detector comprises means for detecting the individual impingement of photons of radiation flux on said radiation detector.

6. The image enhancing system of claim 1, wherein: said radiation detector comprises means for detecting line integrals of radiation impinging on said radiation detector.

7. A radiation detector and image processing system comprising:

locating means for identifying, to a given accuracy, the elemental area of a detector within which radiation was detected, a matrix whose elements are arrayed in rows (i) and columns (j) and are identified by the variables (i,j) and are in one-to-one correspondence with said elemental areas of said detector, each of which is represented by a single point whose coordinates are x and y of a Cartesian coordinate system having the axes X, Y, data processor means for multiplying the number (N) of events at a given x and y location by a given arbitrary normalization factor (G);

means for storing the product (F) where $(F)=(GN)$ in the said matrix at the corresponding locations;

the improvement comprising:

an arithmetic unit incorporated into the said data processor means for modifying and replacing the stored data (F) by modified stored data (F*) thereby enabling the display of less noisy images, said arithmetic unit including:

(a) means for choosing a region around each point corresponding to a matrix element, the region size being determined by said accuracy of the identification of the x and y coordinates, said point serving as a center point for the region;

(b) means for fitting a two dimensional surface to the stored processed data (F) of all the points inside said region;

(c) means for calculating a regional estimator $\overline{C}$ at the said point, such as by taking $\overline{C}$ to be the value of the said surface at the center point of the region;

(d) means for obtaining the regional spread V, by taking the variability of the stored processed data around the said surface in the said region;

(e) means for computing the regional weight $\alpha$ and the local weight $(1-\alpha)$, wherein $$\alpha = (W_2 C)/(W_1 V + W_2 C);$$

where $W_1$ and $W_2$ depend on assumptions made on the nature of the stored processed data (F) and for the case of event counting are calculated by the formulae:

$$W_1 = (2C/G)/(C/G + C);$$

$$W_2 = 2C/(C/G + C);$$

where C is the local estimator of F and G is a normalization factor;

(f) obtaining a new estimator C* by multiplying the regional estimator C by the regional weight $\alpha$, the estimate of the stored processed data (C) of the given point by the local weight $(1-\alpha)$ and summing the two products, the weights being chosen to maximize the likelihood of the new estimator C* to be correct, and wherein $C^* = \alpha C + (1-\alpha) C$ with $$0 \leq \alpha \leq 1.$$

8. An image processing method, for producing and modifying images obtained from an imaging system having a radiation detector for detecting radiation, said method comprising the steps of:

locating to a given accuracy elemental areas in x and y coordinates of the detector upon which the radiation impinged and was detected as an event, multiplying the number (N) of events at a given x and y location by a given arbitrary normalization factor (G), to provide processed data, storing the processed data in matrix whose elements (i,j) are in one-to-one correspondence with said elemental areas, at the corresponding location, modifying and replacing the stored processed data (F) with the modified data F*, enabling display of a less noisy image, said modification step comprising the steps of:

(a) choosing a region of matrix elements around each matrix element having a point corresponding to a central point of an elemental area, the region size being determined by the said accuracy of the locating of the x and y coordinates of the elemental areas, the point on the matrix corresponding to the intersection of the x and the y coordinates servicing as a center point for the region;

(b) fitting a two dimensional surface to the values of the stored processed data stored in each of the elements inside said region;

(c) defining a regional estimator $\overline{C}$ at the center point of the region, by taking $\overline{C}$ to be the value of the said surface at the center point of the region;

(d) obtaining the regional spread V, by taking the variability of the stored processed data around the said surface in the said region;

(e) computing a regional weight $\alpha$ and local weight $(1-\alpha)$ werein $$\alpha = (W_2 C)/(W_1 V + W_2 C);$$

where $W_1$ and $W_2$ depend on assumptions made on the nature of the stored processed data and for the case of event counting are calculated by the formulae:

$$W_1 = 2C/G/(C/G + \overline{C});$$

$$W_2 = \overline{2C}/(C/G + \overline{C})$$

(f) obtaining a new estimator C* by multiplying the regional estimator $\overline{C}$ by the regional weight $\alpha$, a local estimator (C) of the given point by the local weight $(1-\alpha)$, and summing the two products, the local estimator being chosen to maximize the likelihood of the new estimator C* being closer to the true data than the stored processed data.

9. The image processing method according to claim 8, wherein:

the stored processed data is a radiation transmission coefficient comprising an additional pre-step of transforming the stored processed data to count-like data to be further processed and a post-step of transforming the count-like data to the radiation transmission coefficient.

10. The image processing method according to claim 8, wherein:

the stored processed data is a radiation absorption coefficient, comprising an additional pre-step of transforming the stored processed data to count-like data to be further processed and a post step of transforming the count-like data to the radiation absorption coefficient.

11. The image processing method according to claim 10, wherein:

said matrix is a three-dimensional matrix representing a three-dimensional organ and the radiation absorption coefficient is stored in said, three-dimensional matrix, the pre-step consisting of taking N, the one-complement of the exponential of the negative product of the radiation absorption coefficient and the elemental volume size, that is $N = 1 - \exp(\mu - \delta)$ to be the count while the post-step consists of using the inverse transformation on the optimized count, N*:

$$\mu^* = (1/\delta) n(1/1 - N^*)).$$

12. The image processing method according to claim 8, wherein:

the stored processed data is a radiation reflectance coefficient, comprising an additional pre-step of transforming the stored processed data to count-like data to be further processed and a post-step of transforming the count-like data to the radiation reflectance coefficent.

13. An image processing method according to claim 8, wherein:

the stored processed data includes the integral along a line-of-sight of a radiation absorption coefficient, comprising the additional pre-step of transforming the data to count-like data to be processed and a post-step of transforming the count-like data to an integral of the radiation absorption coefficient.

14. The image procesing method of claim 8, wherein: the stored processed data (F) are the integrals of radiation absorption coefficients along a line-of-sight, and comprising the additional pre-step of:

transforming the stored processed data to counts of said interaction to be further processed, and transforming, as a post step, the counts to the radiation absorption coefficients.

15. An image processing method for reducing statistical noise in diagnostic images constructed from data values obtained by the interaction of radiation from an object and detector means, such radiation occuring in a random manner such that the obtained data values, from the said interaction at specific locations on said detector means are statistical estimates of the true values of the data at the locations, said method comprising the steps of:

operating on the obtained data values by fitting a surface to said obtained data values to provide new data values which are closer to the true values of the data values than are the statistical estimates;

the step of operating on the obtained data values includes: taking into account data values in neighbouring locations to arrive at a regional data value for each of the locations;

weighting said regional data value and the obtained data value; and adding said weighted regional value and the obtained data values to provide the said new data value.

* * * * *